US012031006B2

(12) United States Patent
Klostermann et al.

(10) Patent No.: US 12,031,006 B2
(45) Date of Patent: Jul. 9, 2024

(54) USE OF POLYOLETHERS FOR PRODUCING POROUS PLASTIC COATINGS

(71) Applicant: Evonik Operations GmbH, Essen (DE)

(72) Inventors: Michael Klostermann, Essen (DE); Jan Marian Von Hof, Bochum (DE); Martin Glos, Borken (DE); Christian Eilbracht, Herne (DE); Verena Dahl, Bergisch Gladbach (DE); Oliver Springer, Wesel (DE); Hans Henning Wenk, Mülheim an der Ruhr (DE)

(73) Assignee: Evonik Operations GmbH, Essen (DE)

( * ) Notice: Subject to any disclaimer, the term of this patent is extended or adjusted under 35 U.S.C. 154(b) by 140 days.

(21) Appl. No.: 16/632,922

(22) PCT Filed: Aug. 2, 2018

(86) PCT No.: PCT/EP2018/070948
§ 371 (c)(1),
(2) Date: Jan. 22, 2020

(87) PCT Pub. No.: WO2019/042696
PCT Pub. Date: Mar. 7, 2019

(65) Prior Publication Data
US 2020/0207938 A1    Jul. 2, 2020

(30) Foreign Application Priority Data
Aug. 30, 2017 (EP) ..................... 17188505

(51) Int. Cl.
*C08J 9/00* (2006.01)
*C08G 65/327* (2006.01)
*C08J 9/30* (2006.01)
*C09D 175/08* (2006.01)

(52) U.S. Cl.
CPC .......... *C08J 9/0038* (2013.01); *C08G 65/327* (2013.01); *C08J 9/30* (2013.01); *C09D 175/08* (2013.01); *C08G 2150/60* (2013.01); *C08J 2205/044* (2013.01); *C08J 2375/04* (2013.01)

(58) Field of Classification Search
CPC .. C08G 65/327; C08G 2150/60; C08J 9/0023; C08J 9/0038; C08J 9/28; C08J 9/30; C08J 2205/044; C08J 2375/04; C08K 5/06; C08K 5/521; C08L 2201/54; C09D 7/63; C09D 175/08
See application file for complete search history.

(56) References Cited

U.S. PATENT DOCUMENTS

| | | | |
|---|---|---|---|
| 6,669,835 B1 * | 12/2003 | Honnick | C08K 9/12 524/901 |
| 6,683,222 B2 | 1/2004 | Nakamura et al. | |
| 7,371,740 B2 | 5/2008 | Amano et al. | |
| 7,939,596 B2 | 5/2011 | Steinmetz et al. | |
| 9,776,951 B2 | 10/2017 | Friedrich et al. | |
| 10,023,679 B2 | 7/2018 | Klostermann et al. | |
| 10,292,925 B2 | 5/2019 | Gu et al. | |
| 10,351,687 B2 | 7/2019 | Diendorf et al. | |
| 10,385,505 B2 | 8/2019 | Tetsui | |
| 10,457,769 B2 | 10/2019 | Günther et al. | |
| 10,787,464 B2 | 9/2020 | Fiedel et al. | |
| 10,870,723 B2 | 12/2020 | Glos | |
| 2002/0035238 A1 | 3/2002 | Nakamura et al. | |
| 2005/0234023 A1 * | 10/2005 | Amano | C07F 9/091 514/129 |
| 2006/0079635 A1 | 4/2006 | Pohl et al. | |
| 2006/0264330 A1 | 11/2006 | Zerrer et al. | |
| 2008/0188605 A1 * | 8/2008 | Lubnin | C08G 18/12 524/445 |
| 2015/0284902 A1 | 10/2015 | Bhattacharjee et al. | |
| 2016/0096939 A1 | 4/2016 | Glos et al. | |
| 2016/0152739 A1 | 6/2016 | Eilbracht et al. | |
| 2016/0319094 A1 | 11/2016 | Diendorf et al. | |
| 2017/0174817 A1 | 6/2017 | Günther et al. | |
| 2017/0202770 A1 | 7/2017 | Friedrich et al. | |
| 2017/0226264 A1 | 8/2017 | Günther et al. | |
| 2017/0306264 A1 | 10/2017 | Peggau et al. | |
| 2017/0335238 A1 | 11/2017 | Schilling et al. | |
| 2018/0016406 A1 | 1/2018 | Lüthge et al. | |
| 2018/0016525 A1 | 1/2018 | Scheuermann et al. | |
| 2018/0023040 A1 | 1/2018 | Schilling et al. | |
| 2018/0162982 A1 | 6/2018 | Glos | |
| 2018/0194889 A1 | 7/2018 | Günther et al. | |
| 2018/0327563 A1 | 11/2018 | Klostermann et al. | |

(Continued)

FOREIGN PATENT DOCUMENTS

| | | | |
|---|---|---|---|
| CN | 1626538 A | 6/2005 | |
| CN | 101331196 A | 12/2008 | |

(Continued)

OTHER PUBLICATIONS

Klostermann et al., U.S. Appl. No. 17/321,609, filed May 17, 2021.
Klostermann et al., U.S. Appl. No. 17/331,429, filed May 26, 2021.
Klostermann et al., U.S. Appl. No. 17/331,452, filed May 26, 2021.
Klostermann et al., U.S. Appl. No. 17/333,559, filed May 28, 2021.
Ferenz et al., U.S. Appl. No. 17/523,059, filed Nov. 10, 2021.
Glos et al., U.S. Appl. No. 17/636,546, filed Feb. 18, 2022.
Klostermann et al., U.S. Appl. No. 17/612,663, filed Nov. 19, 2021.
Klostermann et al., U.S. Appl. No. 17/612,690, filed Nov. 19, 2021.
Klostermann et al., U.S. Appl. No. 17/617,020, filed Dec. 7, 2021.

(Continued)

*Primary Examiner* — John M Cooney

(74) *Attorney, Agent, or Firm* — Grüneberg and Myers PLLC

(57) ABSTRACT

The invention relates to the use of polyolethers as additives in aqueous polymer dispersions for producing porous polymer coatings, preferably for producing porous polyurethane coatings.

23 Claims, No Drawings

(56) References Cited

U.S. PATENT DOCUMENTS

| | | |
|---|---|---|
| 2018/0344602 A1 | 12/2018 | Schuch et al. |
| 2019/0040095 A1 | 2/2019 | Lu et al. |
| 2019/0135734 A1 | 5/2019 | Liebig et al. |
| 2019/0202771 A1 | 7/2019 | Von Hof et al. |
| 2019/0233571 A1 | 8/2019 | Diendorf et al. |
| 2019/0269158 A1 | 9/2019 | Schilling et al. |
| 2019/0300728 A1 | 10/2019 | Klostermann et al. |
| 2019/0300917 A1 | 10/2019 | Eckstein et al. |
| 2019/0307657 A1 | 10/2019 | Wenk et al. |
| 2020/0155436 A1 | 5/2020 | Hartung et al. |
| 2020/0239621 A1 | 7/2020 | Glos |
| 2021/0047474 A1 | 2/2021 | Klostermann et al. |
| 2021/0337835 A1 | 11/2021 | Schilling et al. |
| 2021/0371773 A1 | 12/2021 | Brandt et al. |
| 2022/0017679 A1 | 1/2022 | Glos et al. |
| 2022/0025417 A1 | 1/2022 | Eckstein et al. |
| 2022/0041829 A1 | 2/2022 | Glos et al. |

FOREIGN PATENT DOCUMENTS

| | | | | |
|---|---|---|---|---|
| CN | 101787243 A | | 7/2010 | |
| EP | 1514872 A1 | | 3/2005 | |
| EP | 3029110 A1 | | 6/2016 | |
| JP | H10-338744 A | | 12/1998 | |
| JP | 2000-239208 A | | 9/2000 | |
| JP | 2006518349 | | 8/2006 | |
| JP | 2011001277 A | | 1/2011 | |
| JP | 2012-131996 A | | 7/2012 | |
| JP | 2013-234292 A | | 11/2013 | |
| WO | WO-02074826 A1 | * | 9/2002 | ............ C08G 18/10 |
| WO | 2012082157 A1 | | 6/2012 | |
| WO | WO-2013173447 A1 | * | 11/2013 | ............ A23L 29/10 |
| WO | 2015/033732 A1 | | 3/2015 | |
| WO | 2018015260 A1 | | 1/2018 | |

OTHER PUBLICATIONS

Klostermann et al., U.S. Appl. No. 17/617,127, filed Dec. 7, 2021.
German language International Search Report dated Oct. 24, 2018 in PCT/EP2018/070948 (3 pages).
German language Written Opinion dated Oct. 24, 2018 in PCT/EP2018/070948 (7 pages).
International Search Report dated Oct. 24, 2018 in PCT/EP2018/070948 (2 pages).
Lu et al., U.S. Appl. No. 16/631,248, filed Jan. 15, 2020.
Lobert et al., U.S. Appl. No. 17/706,552, filed Mar. 28, 2022.
European Search Report dated Feb. 27, 2018, in European Application No. 17188505.6, 8 pages.
R. R. Jay, "Direct Titration of Epoxy Compounds and Aziridines", Analytical Chemistry, vol. 36, No. 3, Mar. 1964, pp. 667-668.
English translation of Written Opinion dated Oct. 24, 2018, in PCT/EP2018/070948, 7 pages.

* cited by examiner

USE OF POLYOLETHERS FOR PRODUCING POROUS PLASTIC COATINGS

CROSS REFERENCE TO RELATED APPLICATIONS

This application is a 35 U.S.C. § 371 U.S. national phase entry of International Application No. PCT/EP2018/070948 having an international filing date of Aug. 2, 2018, which claims the benefit of European Application No. 17188505.6 filed Aug. 30, 2017, each of which is incorporated herein by reference in its entirety.

FIELD

The present invention is in the field of plastics coatings, synthetic leathers and polyol ethers.

It relates more particularly to the production of porous polymer coatings, especially porous polyurethane coatings, using polyol ethers as additives.

BACKGROUND

Textiles coated with plastics, for example synthetic leathers, generally consist of a textile carrier onto which is laminated a porous polymer layer which has in turn been coated with a top layer or a topcoat.

The porous polymer layer in this context preferably has pores in the micrometre range and is air-permeable and hence breathable, i.e. permeable to water vapor, but water-resistant. The porous polymer layer often comprises porous polyurethane. At present, porous polyurethane layers are usually produced by a coagulation method in which DMF is used as solvent. Owing to environmental concerns, however, this production method is being increasingly criticized, and so it should be succeeded gradually by other, more environmentally friendly technologies. One of these technologies is based on aqueous polyurethane dispersions, called PUDs. These generally consist of polyurethane microparticles dispersed in water; the solids content is usually in the range of 30-60% by weight. For production of a porous polyurethane layer, these PUDs are mechanically foamed, coated onto a carrier (layer thicknesses typically between 300-2000 μm) and then dried at elevated temperature. During this drying step, there is evaporation of the water present in the PUD system, which results in formation of a film of the polyurethane particles. In order to further increase the mechanical strength of the film, it is additionally possible to add hydrophilic (poly)isocyanates to the PUD system during the production process, and these can react with free OH radicals present on the surface of the polyurethane particles during the drying step, thus leading to additional crosslinking of the polyurethane film.

Both the mechanical and the tactile properties of PUD coatings thus produced are determined to a crucial degree by the cell structure of the porous polyurethane film. In addition, the cell structure of the porous polyurethane film affects the air permeability and breathability of the material. Particularly good properties can be achieved here with very fine, homogeneously distributed cells. A customary way of influencing the cell structure during the above-described production process is to add surfactants to the PUD system before or during the mechanical foaming. A first effect of appropriate surfactants is that sufficient amounts of air can be beaten into the PUD system during the foaming operation. Secondly, the surfactants have a direct effect on the morphology of the air bubbles thus produced. The stability of the air bubbles is also influenced to a crucial degree by the type of surfactant. This is important especially during the drying of foamed PUD coatings, since it is possible in this way to prevent drying effects such as cell coarsening or drying cracks.

The prior art discloses a number of ionic and nonionic surfactants which can be used for production of porous, PUD-based textile composite materials. Especially preferred in this context are usually anionic surfactants based on ammonium stearate; see, for example, US 2015/0284902 A1 or US 2006/0079635 A1.

However, the use of ammonium stearate is associated with various disadvantages. Firstly, ammonium stearate is susceptible to hard water. In polymer dispersions containing calcium ions, it is possible here for insoluble calcium soaps to form, which results in flocculation or gelation of the polymer dispersions. Synthetic leather produced on the basis of ammonium stearate, moreover, has the disadvantage that calcium soaps can form at the synthetic leather surface on contact with hard water, and these are manifested as white spots. This is undesirable especially in the case of dark-colored leather. Furthermore, ammonium stearate has the disadvantage that it has quite a high migration capacity in the dried polyurethane film. Especially on contact with water, it is possible here for a lubrication film, which is perceived as unpleasant, to arise at the surface of the synthetic leather coating. A further disadvantage of ammonium stearate is that it generally has to be used in combination with other surfactants in order to be able to arrive at an adequate foam stability at all; the prior art here describes sulphosuccinamates, for example. These additional components lead to elevated complexity in use.

As yet unpublished European patent application 16180041.2 has already described the use of polyol esters for production of porous polymer coatings, especially porous polyurethane coatings. It has been shown here that corresponding polyol esters allow efficient foaming of aqueous polymer dispersions without having the disadvantages detailed in the prior art. However, one disadvantage of these polyol esters can be that they have only inadequate hydrolysis stability in the aqueous polymer dispersions, especially at high pH values. The problem addressed by the present invention was therefore that of providing a further class of surfactants which likewise allows efficient foaming of aqueous polymer dispersions, but additionally features elevated hydrolysis stability. It has been found that, surprisingly, the use of polyol ethers enables the solution of the stated problem.

SUMMARY

The present invention therefore provides for the use of polyol ethers as additives in aqueous polymer dispersions for production of porous polymer coatings, preferably for production of porous polyurethane coatings.

DETAILED DESCRIPTION

The porous polymer layer to be produced in accordance with the invention (i.e. the porous polymer coating) here preferably has pores in the micrometre range, the mean cell size preferably being less than 150 μm, preferably less than 120 μm, especially preferably less than 100 μm, most preferably less than 75 μm. The preferred layer thickness is in the range of 10-10 000 μm, preferably of 50-5000 μm, further preferably of 75-3000 μm, especially of 100-2500 μm.

The inventive use of the polyol ethers surprisingly has various advantages.

It enables efficient foaming of the polymer dispersion. The foams thus produced are notable here for an exceptionally fine pore structure with particularly homogeneous cell distribution, which in turn has a very advantageous effect on the mechanical and tactile properties of the porous polymer coatings which have been produced on the basis of these foams. In addition, it is possible in this way to improve the air permeability or breathability of the coating.

A further advantage of the polyol ethers for use in accordance with the invention is that they enable the production of particularly stable foams. This firstly has an advantageous effect on their processability. Secondly, the elevated foam stability has the advantage that, during the drying of corresponding foams, drying defects such as cell coarsening or drying cracks can be avoided. Furthermore, the improved foam stability enables quicker drying of the foams, which offers processing advantages both from an environmental and from an economic point of view.

Yet another advantage of the polyol ethers for use in accordance with the invention is that they are no longer capable of migration in the dried polymer film, especially polyurethane film, particularly when additional (hydrophilic) (poly)isocyanates or melamine-based crosslinkers are added to the system during the drying.

An additional advantage of the polyol ethers for use in accordance with the invention is that they can lead to an increase in viscosity of the foamed, undried dispersion. This in turn can have an advantageous effect on the processibility of the foam. Furthermore, as the case may be, it may be possible as a result to dispense with the use of additional thickeners for adjusting the foam viscosity, or to reduce the use concentration thereof, which brings economic advantages.

Yet another advantage of the polyol ethers for use in accordance with the invention is that they have low susceptibility, if any at all, to hard water.

A further advantage of the polyol ethers for use in accordance with the invention is that they lead to adequate stabilization of foams based on aqueous polymer dispersions even without the use of further surfactants. This can reduce the complexity in the assembly of a suitable foam formulation on the part of the user.

A further advantage of the polyol ethers according to the invention is that they feature excellent hydrolysis stability over a wide pH range.

The term "polyol ethers" in the context of the entire present invention also encompasses the alkoxylated adducts thereof, which can be obtained by reaction of a polyol ether with alkylene oxides, for example ethylene oxide, propylene oxide and/or butylene oxide.

The term "polyol ethers" in the context of the entire present invention also encompasses polyol ester-polyol ether hybrid structures which are prepared by O-alkylation of polyol esters (with regard to the term "polyol esters" see especially the as yet unpublished European patent application 16180041.2) or by esterification of polyol ethers.

The term "polyol ethers" in the context of the entire present invention also encompasses the ionic derivatives thereof, preferably the phosphorylated and sulphated derivatives, especially phosphorylated polyol ethers. These derivatives of the polyol ethers, especially phosphorylated polyol ethers, are polyol ethers usable with preference in accordance with the invention. They are described in detail hereinafter.

The polyol ethers for use in accordance with the invention can especially be prepared by O-alkylation of polyols or by O-alkylation of hydroxyalkanes or hydroxyalkenes. This is known in principle and is described in detail in the technical literature (see, for example, Rompp or Ullmann's Encyclopedia of Industrial Chemistry "Acylation and Alkylation" and the literature cited in each). For instance, it is known that the formation of a carbon-oxygen bond to provide a corresponding polyol ether can be achieved by reaction of a polyol with an alkylating agent. Alkylating agents used may be olefins, alkyl halides (Williamson ether synthesis), alcohols, ethers, epoxides, aldehydes, ketones, thiols, diazo compounds, sulfonic esters and related compounds. Typical catalysts in the case of use of olefins as alkylating agents are, for example, H2SO4, acidic ion exchangers, phosphoric acid and zeolites. In the Williamson ether synthesis, the alcohols or polyols are first converted to their alkoxides by reaction with, for example, sodium or potassium or sodium or potassium hydride, and then reacted with an alkyl halide as alkylating agent. In the case of use of epoxides as alkylating agents, it is possible to use acids, Lewis acids, bases and Lewis bases as catalysts.

The invention is described further and by way of example hereinafter, without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be derived by leaving out individual values (ranges) or compounds. When documents are cited in the context of the present description, the contents thereof, particularly with regard to the subject-matter that forms the context in which the document has been cited, are considered in their entirety to form part of the disclosure content of the present invention. Unless stated otherwise, percentages are figures in percent by weight. When parameters which have been determined by measurement are reported below, the measurements have been determined at a temperature of 25° C. and a pressure of 101 325 Pa, unless stated otherwise.

In the context of the present invention, polyol ethers usable with preference are especially those that are obtainable by the reaction of a polyol with at least one linear or branched, saturated or unsaturated, primary or secondary alcohol or corresponding mixtures. This corresponds to a preferred embodiment of the invention. Corresponding polyol ethers are known per se and are described, for example, in WO2012082157 A2.

In addition, polyol ethers usable with preference in the context of the present invention are especially those that are obtainable by the reaction of a polyol with at least one linear or branched alkyl or alkenyl halide or linear or branched alkyl or alkenyl sulfonate, for example tosylates, mesylates, triflates or nonaflates, or mixtures of such substances. This likewise corresponds to a preferred embodiment of the invention. Corresponding polyol ethers are likewise known per se.

In addition, polyol ethers usable with preference in the context of the present invention are those that are obtainable by the reaction of a polyol with at least one linear or branched alkyl- or alkenyloxirane, thiirane or aziridine or mixtures of such substances. This likewise corresponds to a preferred embodiment of the invention. Corresponding polyol ethers are likewise known per se.

In addition, polyol ethers usable with preference in the context of the present invention are those that are obtainable by the reaction of a polyol with at least one linear or branched alkyl or alkenyl glycidyl ether or mixtures of such substances. This likewise corresponds to a preferred embodiment of the invention. Corresponding polyol ethers are likewise known per se.

In addition, polyethers usable with preference in the context of the present invention are those that are obtainable by the reaction of linear or branched, saturated or unsaturated, primary or secondary alcohols with glycidol or epichlorohydrin or glycerol carbonate or mixtures of these substances. This likewise corresponds to a preferred embodiment of the invention. Corresponding polyol ethers are likewise known per se.

Preferred polyols used for preparation of the polyol ethers according to the invention are selected from the group of the $C_3$-$C_8$ polyols and the oligomers and/or co-oligomers thereof. Co-oligomers result from reaction of different polyols, for example from reaction of propylene glycol with arabitol. Especially preferred polyols here are propane-1,3-diol, propylene glycol, glycerol, trimethylolethane, trimethylolpropane, sorbitan, sorbitol, isosorbide, erythritol, threitol, pentaerythritol, arabitol, xylitol, ribitol, fucitol, mannitol, galactitol, iditol, inositol, volemitol and glucose. Very particular preference is given to glycerol. Preferred polyol oligomers are oligomers of $C_3$-$C_8$ polyols having 1-20, preferably 2-10 and more preferably 2.5-8 repeat units. Especially preferred here are diglycerol, triglycerol, tetraglycerol, pentaglycerol, dierythritol, trierythritol, tetraerythritol, di(trimethylolpropane), tri(trimethylolpropane) and di- and oligosaccharides. Very particular preference is given to sorbitan and oligo- and/or polyglycerols. In particular, it is possible to use mixtures of different polyols. In addition, it is also possible to use alkoxylated adducts of C3-C8 polyols and the oligomers and/or co-oligomers thereof for preparation of the polyethers usable in accordance with the invention, which adducts can be obtained by reaction of C3-C8 polyols and the oligomers and/or co-oligomers thereof with alkylene oxides, for example ethylene oxide, propylene oxide and/or butylene oxide.

In the context of the present invention, the term "polyglycerol" is understood to mean a polyglycerol which may also contain glycerol. Consequently, for the purposes of calculating amounts, masses and the like, any glycerol fraction should also be taken into consideration. In the context of the present invention, polyglycerols are therefore also mixtures comprising at least one glycerol oligomer and glycerol. Glycerol oligomers should be understood in each case to mean all relevant structures, i.e., for example, linear, branched and cyclic compounds. The same applies to the term "polyglycerol ether" in connection with the present invention.

If linear or branched alkyl or alkenyl halides are used for preparation of the polyol ethers, preference is given here especially to those halides which correspond to the general formula R-X where X is a halogen atom, preferably a chlorine atom, even more preferably a bromine atom, even more preferably an iodine atom, and where R is a linear or branched, saturated or unsaturated hydrocarbyl radical having 4 to 40 carbon atoms, preferably 8 to 22, more preferably having 10 to 18 carbon atoms. Very particular preference is given here to alkyl halides selected from 1-chlorooctane, 1-chlorodecane, 1-chlorododecane, 1-chlorotetradecane, 1-chlorohexadecane, 1-chlorooctadecane, 1-chloroeicosane, 1-chlorodocosane and mixtures thereof, very particular preference being given to 1-chlorohexadecane and 1-chlorooctadecane and mixtures of these two substances.

Very particular preference is given here to alkyl halides selected from 1-bromooctane, 1-bromodecane, 1-bromododecane, 1-bromotetradecane, 1-bromohexadecane, 1-bromooctadecane, 1-bromoeicosane, 1-bromodocosane and mixtures thereof, very particular preference being given to 1-bromohexadecane and 1-bromooctadecane and mixtures of these two substances.

Very particular preference is likewise given here to alkyl halides selected from 1-iodooctane, 1-iododecane, 1-iodododecane, 1-iodotetradecane, 1-iodohexadecane, 1-iodooctadecane, 1-iodoeicosane, 1-iodododecosane and mixtures thereof, very particular preference being given to 1-iodohexadecane and 1-iodooctadecane and mixtures of these two substances.

Very particular preference is likewise given here to alkyl halides selected from 2-chlorooctane, 2-chlorodecane, 2-chlorododecane, 2-chlorotetradecane, 2-chlorohexadecane, 2-chlorooctadecane, 2-chloroeicosane, 2-chlorodocosane and mixtures thereof, very particular preference being given to 2-chlorohexadecane and 2-chlorooctadecane and mixtures of these two substances.

Very particular preference is likewise given here to alkyl halides selected from 2-bromooctane, 2-bromodecane, 2-bromododecane, 2-bromotetradecane, 2-bromohexadecane, 2-bromooctadecane, 2-bromoeicosane, 2-bromodocosane and mixtures thereof, very particular preference being given to 2-bromohexadecane and 2-bromooctadecane and mixtures of these two substances.

Very particular preference is likewise given here to alkyl halides selected from 2-iodooctane, 2-iododecane, 2-iodododecane, 2-iodotetradecane, 2-iodohexadecane, 2-iodooctadecane, 2-iodoeicosane, 2-iodododecosane and mixtures thereof, very particular preference being given to 2-iodohexadecane and 2-iodooctadecane and mixtures of these two substances.

If alkyl epoxides are used for preparation of the polyol ethers, preference is given here especially to alkyl epoxides which correspond to the general formula 1

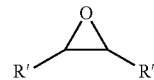

Formula 1 where R' is, independently at each occurrence, identical or different monovalent aliphatic saturated or unsaturated hydrocarbyl radicals having 2 to 38 carbon atoms, preferably 6 to 20, more preferably having 8 to 18 carbon atoms, or H, with the proviso that at least one of the radicals is a hydrocarbyl radical. Particular preference is given here to alkyl epoxides in which exactly one of the R' radicals is a hydrocarbyl radical and the other is H. Very particular preference is given to epoxides which derive from $C_6$-$C_{24}$ alpha-olefins.

If alkyl glycidyl ethers are used for preparation of the polyol ethers, these are preferably selected from the group of the glycidyl ethers of linear or branched, saturated or unsaturated alkyl alcohols having 4 to 40 carbon atoms, preferably 8 to 22, more preferably having 10 to 18 carbon atoms. Very particular preference is given here to alkyl glycidyl ethers selected from octyl glycidyl ether, decyl glycidyl ether, dodecyl glycidyl ether, tetradecyl glycidyl ether, hexadecyl glycidyl ether, octadecyl glycidyl ether, eicosyl glycidyl ether, docosyl glycidyl ether and mixtures thereof, very particular preference being given to hexadecyl glycidyl ether and octadecyl glycidyl ether, and mixtures of these two substances. In a particularly preferred embodiment of the present invention, the polyol ethers are selected from the group of the sorbitan ethers and/or polyglycerol ethers. Particular preference is given to polyglycerol hexadecyl ether, polyglycerol octadecyl ether and mixtures of these two substances. Very particular preference is given to polyglycerol hydroxyhexadecyl ether and polyglycerol hydroxyoctadecyl ether and mixtures of these substances. Even more preferred are polyglycerol 1-hydroxyhexadecyl ether, polyglycerol 2-hydroxyhexadecyl ether, polyglycerol 1-hydroxyoctadecyl ether and polyglycerol 2-hydroxyoctadecyl ether and mixtures of these substances.

Especially preferred here are polyglycerol ethers corresponding to the general formula 2:

$$M_a D_b T_c \qquad \text{Formula 2}$$

where $M=[C_3H_5(OR'')_2O_{1/2}]$ $D=[C_3H_5(OR'')_1O_{2/2}]$ $T=[C_3H_5O_{3/2}]$ a=1 to 10, preferably 2 to 3, especially preferably 2, b=0 to 10, preferably greater than 0 to 5, especially preferably 1 to 4, c=0 to 3, preferably 0, where the R" radicals are independently identical or different monovalent aliphatic saturated or unsaturated hydrocarbyl radicals having 2 to 38 carbon atoms, preferably 6 to 20, more preferably having 8 to 18 carbon atoms or H, with the proviso that at least one of the R" radicals is a hydrocarbyl radical, which may also bear substituents, especially hydroxyl groups.

Even more preferred are polyglycerol ethers corresponding to the general formula 3:

$$M_x D_y T_z \qquad \text{Formula 3}$$

where

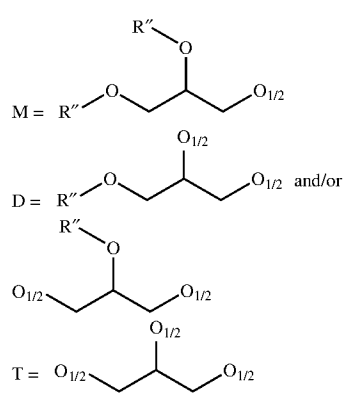

x=1 to 10, preferably 2 to 3, especially preferably 2, y=0 to 10, preferably greater than 0 to 5, especially preferably 1 to 4, z=0 to 3, preferably greater than 0 to 2, especially preferably 0, with the proviso that at least one R" radical is not hydrogen, still R" as defined above.

Further preferred are polyglycerol ethers of the general formula 4:

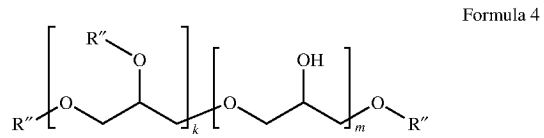

where k=1 to 10, preferably 2 to 3, especially preferably 2, m=0 to 10, preferably greater than 0 to 5, especially preferably 1 to 3, with the proviso that at least one R" radical is not hydrogen, still R" as defined above, and that the sum total of k+m is greater than zero and the fragments having the indices k and m are distributed statistically.

Random distributions are composed of blocks with any desired number of blocks and with any desired sequence, or randomized distribution; they can also have an alternating structure, or else form a gradient along the chain; in particular, they can also constitute any of the mixed forms in which groups of different distributions can optionally follow one another. The nature of specific embodiments can result in restrictions to the random distributions. In all regions unaffected by the restriction there is no change to the random distribution.

Preferably, the polyglycerol ethers usable in accordance with the invention have not more than 6, more preferably not more than 5 and even further preferably not more than 4 radicals hydrocarbyl radicals of the R" form, as described above.

In structural terms, the polyol ethers can be characterized via wet-chemical indices, for example their hydroxyl number. Suitable methods for determining the hydroxyl number are particularly those according to DGF C-V 17 a (53), Ph. Eur. 2.5.3 Method A and DIN 53240. Suitable methods for determining the acid number are particularly those according to DGF C-V 2, DIN EN ISO 2114, Ph. Eur. 2.5.1, ISO 3682 and ASTM D 974. Suitable methods for determining the hydrolysis number are particularly those according to DGF C-V 3, DIN EN ISO 3681 and Ph. Eur. 2.5.6.

Suitable methods of determining the epoxy oxygen content are especially those according to R. Kaiser "Quantitative Bestimmung organischer funktioneller Gruppen", Methoden der Analyse in der Chemie ["Quantitative Determination of Organic Functional Groups", Methods of Analysis in Chemistry], Akad. Verlagsgesellschaft, 1966 and R. R. Jay, Anal. Chem. 1964, 36 (3), 667-668.

Suitable methods of determining the melting point are especially those according to DIN 53181, DIN EN ISO 3416, DGF C-IV 3a and Ph.Eur.2.2.14.

It is preferable in accordance with the invention and corresponds to a particularly preferred embodiment of the invention when, for preparation of the polyglycerol ether, a polyglycerol having a mean degree of condensation of 1-20, preferably of 2-10 and more preferably of 2.5-8 is used. The mean degree of condensation N can be determined here on the basis of the OH number (OHN, in mg KOH/g) of the polyglycerol and is linked thereto according to:

$$N = \frac{112200 - 18 \cdot OHN}{75 \cdot OHN - 56100}$$

The OH number of the polyglycerol can be determined here as described above. Consequently, preferred polyglycerols for preparation of the polyglycerol ethers according to the invention are preferably those which have an OH number of 1829 to 824, more preferably of 1352-888 and especially preferably of 1244-920 mg KOH/g.

The polyglycerol used can be provided by different conventional methods, for example polymerization of glycidol (e.g. base-catalysed), polymerization of epichlorohydrin (for example in the presence of equimolar amounts of a base such as NaOH) or polycondensation of glycerol. This is known from the literature.

It has already been made clear that the term "polyol ethers" in the context of the entire present invention also encompasses the ionic derivatives thereof, preferably the phosphorylated and sulphated derivatives, especially phosphorylated polyol ethers. Phosphorylated polyol ethers are obtainable here by reaction of the polyol ethers with a phosphorylating reagent and optional, preferably obligatory, subsequent neutralization (cf. especially Industrial Applications of Surfactants. II. Preparation and Industrial Applications of Phosphate Esters. Edited by D. R. Karsa, Royal Society of Chemistry, Cambridge, 1990). Preferred phosphorylating reagents in the context of this invention are phosphorus oxychloride, phosphorus pentoxide ($P_4O_{10}$) and more preferably polyphosphoric acid. The term "phosphorylated polyol ethers" over the entire scope of the present invention also covers the partly phosphorylated polyol ethers, and the term "sulphated polyol ethers" over the entire scope of the present invention also covers the partly sulphated polyol ethers.

In addition, ionic derivatives of the polyol ethers, for the purposes of the entire present invention, can also be obtained by reacting the polyethers with di- or tricarboxylic acid or corresponding cyclic anhydrides and optional, preferably obligatory, neutralization.

In addition, ionic derivatives of the polyol ethers, for the purposes of the entire present invention, can also be obtained by reacting the polyethers with unsaturated di- or tricarboxylic acids or corresponding cyclic anhydrides and subsequent sulphonation, and optional, preferably obligatory, neutralization.

The term "neutralization" over the entire scope of the present invention also covers partial neutralization. For neutralization, including partial neutralization, it is possible to use customary bases. These include the water-soluble metal hydroxides, for example barium hydroxide, strontium hydroxide, calcium hydroxide, thallium(I) hydroxide and preferably the hydroxides of the alkali metals that dissociate into free metal and hydroxide ions in aqueous solutions, especially NaOH and KOH. These also include the anhydro bases which react with water to form hydroxide ions, for example barium oxide, strontium oxide, calcium oxide, lithium oxide, silver oxide and ammonia. As well as these aforementioned alkalis, substances usable as bases are also those which likewise give an alkaline reaction on dissolution in water without having HO— (in the solid compound); examples of these include amines such as mono-, di- and trialkylamines, which may also be functionalized alkyl radicals as, for example, in the case of amide amines, mono-, di- and trialkanolamines, mono-, di- and triaminoalkylamines, and, for example, the salts of weak acids, such as potassium cyanide, potassium carbonate, sodium carbonate, trisodium phosphate, etc.

Very particularly preferred polyol ethers in the context of this invention here are phosphorylated sorbitan ethers and/or phosphorylated polyglycerol ethers, in particular phosphorylated polyglycerol ethers. Preference is especially given to a phosphorylated and neutralized polyglycerol hexadecyl ether, a phosphorylated and neutralized polyglycerol octadecyl ether or a mixture of these substances.

A particularly preferred embodiment of this invention envisages the use in accordance with the invention of polyol ethers of the formula 2, 3 and/or 4, as specified above, with the additional proviso that they have been (at least partly) phosphorylated, such that these polyol ethers of the formula 2, 3 and/or 4 especially bear at least one $(R'''O)_2P(O)$-radical as the R'' radical, where the R''' radicals are independently cations, preferably $Na^+$, $K^+$ or $NH_4^+$, or ammonium ions of mono-, di- and trialkylamines, which may also be functionalized alkyl radicals as, for example, in the case of amide amines, of mono-, di- and trialkanolamines, of mono-, di- and triaminoalkylamines, or H or R''''—O—,
where R'''' is a monovalent aliphatic saturated or unsaturated hydrocarbyl radical having 3 to 39 carbon atoms, preferably 7 to 22 and more preferably 9 to 18 carbon atoms or a polyol radical.

In the case of the sulphated polyol ethers, preference is given especially to those obtainable by reaction of the polyol ethers with sulphur trioxide or amidosulphonic acid. Preference is given here to sulphated sorbitan ethers and/or sulphated polyglycerol ethers.

In a particularly preferred embodiment of the present invention, polyol ethers are not used in neat form but in a blend with at least one co-surfactant as additives in aqueous polymer dispersions. Co-surfactants preferred in accordance with the invention are, for example, fatty acid amides, alcohol alkoxylates, for example fatty alcohol ethoxylates, nonylphenol ethoxylates, ethylene oxide-propylene oxide block copolymers, betaines, for example amidopropyl betaines, amine oxides, quaternary ammonium surfactants or amphoacetates. In addition, the co-surfactant may comprise silicone-based surfactants, for example trisiloxane surfactants or polyether siloxanes.

Especially preferred co-surfactants are ionic, preferably anionic, co-surfactants. Preferred an ionic co-surfactants here are the ammonium and/or alkali metal salts of fatty acids, alkyl sulphates, alkyl ether sulphates, alkyl sulphonates, alkylbenzenesulphonates, alkyl phosphates, alkyl sulphosuccinates, alkyl sulphosuccinamates and alkyl sarcosinates. Especially preferred here are alkyl sulphates having 12-20 carbon atoms, more preferably having 14-18 carbon atoms, even more preferably having more than 16-18 carbon atoms, In the case of ammonium and/or alkali metal salts of fatty acid, it is preferable when they contain less than 25% by weight of stearate salts, and are especially free of stearate salts.

In the case of use of co-surfactants, it is especially preferable when the proportion of co-surfactant based on the total amount of polyol ether plus co-surfactant is in the range of 0.1-50% by weight, preferably in the range of 0.2-40% by weight, more preferably in the range of 0.5-30% by weight, even more preferably in the range of 1-25% by weight.

As already described, the present invention provides for the use of polyol ethers as additives in aqueous polymer dispersions for production of porous polymer coatings. The polymer dispersions here are preferably selected from the group of aqueous polystyrene dispersions, polybutadiene dispersions, poly(meth)acrylate dispersions, polyvinyl ester dispersions and polyurethane dispersions. The solids content of these dispersions is preferably in the range of 20-70% by weight, more preferably in the range of 25-65% by weight. Particular preference is given in accordance with the invention to the use of polyol ethers as additives in aqueous polyurethane dispersions. Especially preferable here are polyurethane dispersions based on polyester polyols, polyester amide polyols, polycarbonate polyols, polyacetal polyols and polyether polyols.

The use concentration of the polyol ethers according to the invention in aqueous polymer dispersions is preferably in the range of 0.2-10% by weight, more preferably in the range of 0.4-7.5% by weight, especially preferably in the range of 0.5-5% by weight, based on the total weight of the dispersion.

The polyol ethers can be added to the aqueous dispersion either neat or diluted in a suitable solvent. Preferred solvents here are selected from water, propylene glycol, dipropylene glycol, polypropylene glycol, butyldiglycol, butyltriglycol, ethylene glycol, diethylene glycol, polyethylene glycol, polyalkylene glycols based on EO, PO, BO and/or SO, and mixtures of these substances. In the case of aqueous solutions or blends of the polyol ethers of the invention, it may be advantageous when hydrotropic compounds are added to the blend to improve the formulation properties (viscosity, homogeneity, etc.). Hydrotropic compounds here are water-soluble organic compounds consisting of a hydrophilic part and a hydrophobic part, but are too low in molecular weight to have surfactant properties. They lead to an improvement in the solubility or in the solubility properties of organic, especially hydrophobic organic, substances in aqueous formulations. The term "hydrotropic compounds" is known to those skilled in the art. Preferred hydrotropic compounds in the context of the present invention are alkali metal and ammonium toluenesulphonates, alkali metal and ammonium xylenesulphonates, alkali metal and ammonium naphthalenesulphonates, alkali metal and ammonium cumenesulphonates, and phenol alkoxylates, especially phenyl ethoxylates, having up to 6 alkoxylate units.

As well as the polyol ethers according to the invention, the aqueous polymer dispersions may also comprise further additives, for example fillers, organic and inorganic pigments, flatting agents, stabilizers such as hydrolysis or UV stabilizers, antioxidants, absorbers, crosslinkers, levelling additives, thickeners or optionally other co-surfactants as described above.

Preferably, the polyol ethers according to the invention are used in aqueous polymer dispersions as foaming aids or foam stabilizers for foaming of the dispersions. In addition, however, they can also be used as drying aids, levelling additives, wetting agents and rheology additives.

Since, as described above, the polyol ethers lead to a distinct improvement in porous polymer coatings produced from aqueous polymer dispersions, the present invention likewise provides aqueous polymer dispersions comprising at least one of the polyol ethers of the invention, as described in detail above.

The present invention still further provides porous polymer layers which have been produced from aqueous polymer dispersions, obtained using the polyol ethers according to the invention as additives, as described in detail above.

Preferably, the porous polymer coatings according to the invention can be produced by a process comprising the steps of
a) providing a mixture comprising an aqueous polymer dispersion, as described above, at least one of the polyol ethers according to the invention and optionally further additives,
b) foaming the mixture to give a homogeneous, fine-cell foam,
c) optionally adding at least one thickener to establish the viscosity of the wet foam,
d) applying a coating of the foamed polymer dispersion to a suitable carrier,
e) drying the coating.

With a view to preferred configurations, especially with a view to the polyol ethers usable with preference in the process and aqueous polymer dispersions usable with preference, reference is made to the preceding description and also to the aforementioned preferred embodiments.

It is made clear that the process steps of the process according to the invention as set out above are not subject to any fixed sequence in time. For example, process step c) can be executed at an early stage, at the same time as process step a).

It is a preferred embodiment of the present invention when, in process step b), the aqueous polymer dispersion is foamed by the application of high shear forces. The foaming can be effected here with the aid of shear units familiar to the person skilled in the art, for example Dispermats, dissolvers, Hansa mixers or Oakes mixers.

It is additionally preferred when the wet foam produced at the end of process step c) has a viscosity of at least 3, preferably of at least 5, more preferably of at least 7.5, and even more preferably of at least 10 Pa·s. The viscosity of the foam can be determined here, for example, with the aid of a Brookfield viscometer, LVTD model, equipped with an LV-4 spindle. Corresponding test methods for determination of the wet foam viscosity are known to those skilled in the art.

As already described above, additional thickeners can be added to the system to adjust the wet foam viscosity.

Preferably, the thickeners which can be used advantageously in the context of the invention are selected here from the class of the associative thickeners. Associative thickeners here are substances which lead to a thickening effect through association at the surfaces of the particles present in the polymer dispersions. The term is known to those skilled in the art. Preferred associative thickeners are selected here from polyurethane thickeners, hydrophobically modified polyacrylate thickeners, hydrophobically modified polyether thickeners and hydrophobically modified cellulose ethers. Very particular preference is given to polyurethane thickeners. In addition, it is preferable in the context of the present invention when the concentration of the thickeners based on the overall composition of the dispersion is in the range of 0.01-10% by weight, more preferably in the range of 0.05-5% by weight, most preferably in the range of 0.1-3% by weight.

In the context of the present invention, it is additionally preferable when, in process step d), coatings of the foamed polymer dispersion with a layer thickness of 10-10,000 µm, preferably of 50-5000 µm, more preferably of 75-3000 µm, even more preferably of 100-2500 µm, are produced. Coatings of the foamed polymer dispersion can be produced by methods familiar to the person skilled in the art, for example knife coating. It is possible here to use either direct or indirect coating processes (called transfer coating).

It is also preferable in the context of the present invention when, in process step e), the drying of the foamed and coated polymer dispersion is effected at elevated temperatures. Preference is given here in accordance with the invention to drying temperatures of min. 50° C., preferably of 60° C., more preferably of at least 70° C. In addition, it is possible to dry the foamed and coated polymer dispersions in multiple stages at different temperatures, in order to avoid the occurrence of drying defects. Corresponding drying techniques are widespread in industry and are known to those skilled in the art.

As already described, process steps c)-e) can be effected with the aid of widely practised methods known to those skilled in the art. An overview of these is given, for example, in "Coated and laminated Textiles" (Walter Fung, CR-Press, 2002).

In the context of the present invention, preference is given especially to those porous polymer coatings comprising polyol ethers, having a mean cell size less than 250 µm, preferably less than 150 µm, especially preferably less than 100 µm, most preferably less than 75 µm. The mean cell size can preferably be determined by microscopy, preferably by electron microscopy. For this purpose, a cross section of the porous polymer coating is viewed by means of a microscope with sufficient magnification and the size of at least 25 cells is ascertained. In order to obtain sufficient statistics for this evaluation method, the magnification of the microscope chosen should preferably be such that at least 10×10 cells are present in the observation field. The mean cell size is then calculated as the arithmetic mean of the cells or cell sizes viewed. This determination of cell size by means of a microscope is familiar to the person skilled in the art.

The porous polymer layers (or polymer coatings) according to the invention, comprising polyol ethers, can be used, for example, in the textile industry, for example for synthetic leather materials, in the building and construction industry, in the electronics industry, for example for foamed seals, in the sports industry, for example for production of sports mats, or in the automotive industry.

The present invention further provides phosphorylated polyol ethers obtainable by the reaction of a polyol ether obtained as described above with a phosphorylating reagent and optional, preferably obligatory, subsequent neutralization, where the phosphorylating reagent especially comprises phosphorus oxychloride, phosphorus pentoxide ($P_4O_{10}$) and/or polyphosphoric acid. The term "phosphorylated polyol ethers" again encompasses, here and hereinafter, the partly phosphorylated polyol ethers. The term "neutralization" again encompasses, here and hereinafter, partial neutralization. Preferred bases usable for neutralization have already been recited further up.

With regard to preferred configurations, especially with a view to polyols and alkyl halides or alkyl epoxides usable with preference, reference is made completely to the preceding description and preferred configurations mentioned therein, in order to avoid unnecessary repetition.

Particularly preferred phosphorylated polyol ethers are phosphorylated polyglycerol ethers, preferably phosphorylated and neutralized polyglycerol ethers, especially phosphorylated and neutralized polyglycerol hexadecyl ethers, phosphorylated and neutralized polyglycerol octadecyl ethers, and a mixtures of these substances. Preference is further given to phosphorylated and neutralized polyglycerol hydroxyalkyl ethers, especially phosphorylated and neutralized polyglycerol hydroxyhexadecyl ethers, phosphorylated and neutralized polyglycerol hydroxyoctadecyl ethers and mixtures of these substances. Even more preferred are phosphorylated and neutralized polyglycerol 1-hydroxyhexadecyl ethers, phosphorylated and neutralized polyglycerol 2-hydroxyhexadecyl ethers, phosphorylated and neutralized polyglycerol 1-hydroxyoctadecyl ethers and phosphorylated and neutralized polyglycerol 2-hydroxyoctadecyl ethers, and mixtures of these substances. Likewise particularly preferred are phosphorylated sorbitan ethers, preferably phosphorylated and neutralized sorbitan ethers.

Polyglycerols used with preference for preparation of the polyglycerol ethers have an OH number of 1829 to 824, more preferably of 1352-888 and especially preferably of 1244-920 mg KOH/g.

Phosphorylated polyol ethers, preferably phosphorylated polyglycerol ethers, especially phosphorylated and neutralized polyglycerol ethers, enable very particularly efficient foaming of PUD systems, associated with all the advantages cited at the outset.

The present invention provides sulphated polyol ethers, especially sulphated polyglycerol ethers, preferably obtainable by reacting the polyol ethers, preferably polyglycerol ethers, with sulphur trioxide or amidosulphonic acid. These too enable very particularly efficient foaming of PUD systems, associated with all the advantages cited at the outset.

The invention further provides phosphorylated polyol ethers obtainable by
(a) providing a polyol ether by reacting a polyol with at least one alkyl halide or alkylene halide, preferably an alkyl chloride, at least one primary or secondary alcohol or else at least one alkyl- or alkenyloxirane, thiirane or aziridine, preferably alkyl epoxide, or by the reaction of primary or secondary alcohols with glycidol, epichlorohydrin and/or glycerol carbonate
(b) subsequent reaction with a phosphorylating reagent and
(c) optional, preferably obligatory, subsequent neutralization,
where the phosphorylating reagent especially comprises phosphorus oxychloride, phosphorus pentoxide ($P_4O_{10}$) and/or polyphosphoric acid.

In a preferred embodiment of the invention, it is a feature of the phosphorylated polyol ether that it is a phosphorylated polyglycerol ether and/or phosphorylated sorbitan ether, preferably phosphorylated and neutralized polyglycerol ether and/or phosphorylated and neutralized sorbitan ether, especially a phosphorylated and neutralized polyglycerol hexadecyl ether, phosphorylated and neutralized polyglycerol octadecyl ether and a mixture of these substances.

When the polyglycerol used for preparation of the polyglycerol ethers has an OH number of 1829 to 824, more preferably of 1352-888 and especially preferably of 1244-920 mg KOH/g, this is again a preferred embodiment of the invention.

With regard to further preferred configurations, reference is made to the preceding description.

The invention further provides a phosphorylated polyglycerol ether corresponding to the general formula 2a:

$$M_a D_b T_c \qquad \text{Formula 2a}$$

where
$M = [C_3H_5(OR'')_2 O_{1/2}]$
$D = [C_3H_5(OR'')_1 O_{2/2}]$
$T = [C_3H_5 O_{3/2}]$
a=1 to 10, preferably 2 to 3, especially preferably 2,
b=0 to 10, preferably greater than 0 to 5, especially preferably 1 to 4,
c=0 to 3, preferably 0,
where the R'' radicals are independently identical or different radicals of the (R'''O)$_2$P(O)— form, monovalent aliphatic saturated or unsaturated hydrocarbyl radicals having 2 to 38 carbon atoms, preferably 6 to 20 and more preferably 8 to 18 carbon atoms or H, with the proviso that at least one of the R'' radicals is a hydrocarbyl radical and where at least one R'' radical corresponds to the (R'''O)$_2$P(O)— form,
where the R''' radicals are each independently cations, preferably Na$^+$, K$^+$ or NH$_4^+$, or ammonium ions of mono-, di- and trialkylamines, which may also be functionalized alkyl radicals as, for example, in the case of amide amines, of mono-, di- and trialkanolamines, of mono-, di- and triaminoalkylamines, or H or R''''—O—, where R''' is a monovalent aliphatic saturated or unsaturated hydrocarbyl radical having 3 to 39 carbon atoms, preferably 7 to 22 and more preferably 9 to 18 carbon atoms or a polyol radical, and/or correspond to the general formula 3a:

$$M_xD_yT_z$$   Formula 3a where

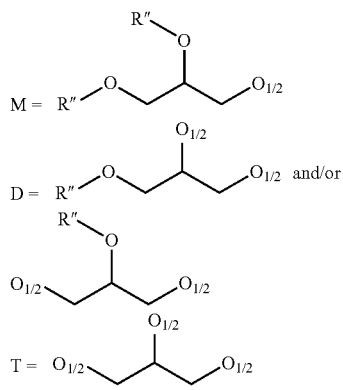

x=1 to 10, preferably 2 to 3, especially preferably 2,
y=0 to 10, preferably 0 greater than to 5, especially preferably 1 to 4,
z=0 to 3, preferably greater than 0 to 2, especially preferably 0, with the proviso that at least one R'' radical a hydrocarbyl radical and at least one R'' radical corresponds to a radical of the (R'''O)$_2$P(O)-form, still R'' as defined above, and/or correspond to the general formula 4a:

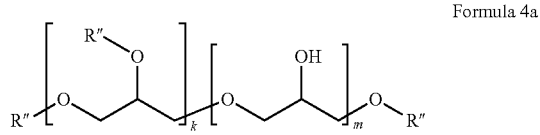   Formula 4a where
k=1 to 10, preferably 2 to 3, especially preferably 2,
m=0 to 10, preferably greater than 0 to 5, especially preferably 1 to 3, with the proviso that at least one R'' radical a hydrocarbyl radical and at least one R'' radical corresponds to a radical of the (R'''O)$_2$P(O)— form, still R'' as defined above, and that the sum total of k+m is greater than zero and the fragments having the indices k and m are distributed statistically.

EXAMPLES

Substances

Impranil® DLU: aliphatic polycarbonate ester-polyether-polyurethane dispersion from Covestro
Stokal® STA: ammonium stearate (about 30% in H$_2$O) from Bozetto
Stokal® SR: tallow fat-based sodium sulphosuccinamate (about 35% in H$_2$O) from Bozetto
Tego® Viscoplus 3030: polyurethane-based associative thickener from Evonik Industries AG.

Viscosity Measurements

All viscosity measurements were conducted with a Brookfield viscometer, LVTD, equipped with an LV-4 spindle, at a constant rotation speed of 12 rpm. For the viscosity measurements, the samples were transferred into a 100 ml jar into which the measurement spindle was immersed. The display of a constant viscometer measurement was always awaited.

Example 1A: Synthesis of Polyglyceryl Hydroxystearyl Ether

A mixture of commercially available polyglycerol-3 (Spiga Nord, hydroxyl number 1124 mg KOH/g, 52.5 g, 0.219 mol, 1.0 equiv.) and sodium methoxide (1.96 g of a 25% solution in methanol, 0.009 mol, 0.04 equiv.) was heated to 180° C. while stirring and introducing N$_2$ at 15 mbar within 2 h, and the methanol was distilled off After the attainment of 180° C., the vacuum was broken and then 1,2-epoxyoctadecane (CAS RN 7390-81-0, 85%, 97.0 g, 0.361 mol, 1.65 equiv.) that had been heated to 80° C. was slowly added dropwise over 1 h. The mixture was stirred at 180° C. for a further 4 h until an epoxy oxygen content of 0.16% had been attained. Subsequently, the mixture was cooled down to 90° C. and the phases were separated. 5.6 g of unconverted polyglycerol (lower phase) and 113 g of polyglyceryl hydroxyalkyl ether (upper phase, melting point=71.5° C., hydroxyl number=387 mg KOH/g, acid number=0.4 mg KOH/g, epoxy oxygen content=0.06%) were obtained.

Example 1B: Phosphorylation of Polyglyceryl Hydroxystearyl Ether

A mixture of a polyglyceryl hydroxyalkyl ether (97.62 g, obtained as described in Example 1A) and polyphosphoric acid (115% H$_3$PO$_4$, 2.38 g) was heated to 80° C. while stirring for 4 h. Thereafter, the mixture had an acid number of 27.6 mg KOH/g. Subsequently, 45% aqueous KOH solution (9.77 g) was added at 80° C. and the mixture was stirred at 80° C. for a further 30 min. The mixture had an acid number of 1.3 mg KOH/g.

Example 1C: Synthesis of a Polyglyceryl Hydroxystearyl Ether Stearate

A mixture of a polyglyceryl hydroxyalkyl ether (150 g, obtained as described in Example 1A) and stearic acid (44.3 g, 0.156 mol) was heated to 240° C. while stirring and introducing N$_2$ within 3 h and stirred at 240° C. until an acid number of ≤1 mg KOH/g had been attained. 186 g of polyglyceryl hydroxystearyl ether stearate (hydroxyl number=264 mg KOH/g, acid number=0.6 mg KOH/g, hydrolysis number 44 mg KOH/g) were obtained.

Example 2A: Synthesis of Polyglyceryl Hydroxystearyl Ether

A mixture of commercially available polyglycerol-3 (Spiga Nord, hydroxyl number 1124 mg KOH/g, 52.6 g, 0.219 mol, 1.0 equiv.) and conc. sulphuric acid (0.36 g) was heated to 100° C. while stirring and introducing N$_2$ at 15 mbar within 1 h. After the attainment of 100° C., the vacuum was broken and then 1,2-epoxyoctadecane (CAS RN 7390-81-0, 85%, 97.1 g, 0.362 mol, 1.65 equiv.) that had been heated to 80° C. was slowly added dropwise over 1 h. The mixture was stirred at 100° C. for a further 4 h until an epoxy oxygen content of 0.01% had been attained. Subsequently, the mixture was cooled down to 90° C. and the phases were separated. 22.8 g of unconverted polyglycerol (lower phase) and 113.8 g of polyglyceryl hydroxystearyl ether (upper phase, melting point=49.5° C., hydroxyl number=268 mg KOH/g, acid number=0.6 mg KOH/g, epoxy oxygen content=0.01%) were obtained.

Example 2B: Phosphorylation of Polyglyceryl Hydroxystearyl Ether

A mixture of a polyglyceryl hydroxyalkyl ether (98.81 g) obtained as described in Example 2A and polyphosphoric acid (115% H$_3$PO$_4$, 1.19 g) was heated to 80° C. while stirring for 4 h. Thereafter, the mixture had an acid number of 12 mg KOH/g. Subsequently, at 80° C., 45% aqueous KOH solution (2.67 g) was added and the mixture was stirred at 80° C. for a further 30 min. The mixture had an acid number of 1.0 mg KOH/g.

Example 2C: Synthesis of Potassium Polyglyceryl Hydroxystearyl Ether Succinate

A polyglyceryl hydroxyalkyl ether (300 g) obtained as described in Example 2A was heated to 80° C. and, while stirring, succinic anhydride (9.15 g) was added in portions within 1 h. The mixture was stirred at 80° C. for a further 2 h until an acid number of 19.2 mg KOH/g had been attained. Subsequently, 12.90 g of a 45% aqueous KOH solution were added and the mixture was stirred for a further 15 min. The potassium polyglyceryl hydroxystearyl ether succinate obtained had an acid number: 8.0 mg KOH/g.

Example 3: Formulation and Blending of Surfactants According to the Invention

The surfactants according to the invention from Examples 1 A-C and 2 A-C were blended according to the compositions detailed in Table 1 and 2 and then homogenized at 80° C.:

TABLE 1

Composition of surfactant blends used hereinafter

|  | Surfactant 1 | Surfactant 2 | Surfactant 3 |
| --- | --- | --- | --- |
| Polyglycerol hydroxystearyl ether (from Example 1 A) | 19.7 g | — | — |
| Phosphorylated polyglycerol hydroxystearyl ether (from Example 1 B) | — | 21.3 g | — |
| Polyglycerol hydroxystearyl ether stearate (from Example 1 C) | — | — | 19.7 g |
| Cetearyl sulphate | 1.6 g | — | 1.6 g |
| Water | 59.1 g | 59.1 g | 59.1 g |
| Propylene glycol | 6.25 g | 6.25 g | 6.25 g |

TABLE 2

Composition of surfactant blends used hereinafter

|  | Surfactant 4 | Surfactant 5 | Surfactant 6 |
| --- | --- | --- | --- |
| Polyglycerol hydroxystearyl ether (from Example 2 A) | 19.7 g | — | — |
| Phosphorylated polyglycerol hydroxystearyl ether (from Example 2 B) | — | 21.3 g | — |
| Potassium polyglyceryl hydroxystearyl ether succinate (from Example 2 C) | — | — | 21.3 g |
| Cetearyl sulphate | 1.6 g | — | — |
| Water | 59.1 g | 59.1 g | 59.1 g |
| Propylene glycol | 6.25 g | 6.25 g | 6.25 g |

Example 4

150 g of the dispersion Impranil® DLU were placed in a 500 ml plastic beaker and stirred with the aid of a VMA Getzmann dissolver equipped with a dissolver disc (∅=6 cm) at 800 rpm for 3 min. During this time, the surfactant was added gradually with the aid of a syringe. The exact compositions of the samples are listed in the Tables 3 and 4.

For foaming of the mixtures, the shear rate was then increased to 2000 rpm, ensuring that the dissolver disc was always immersed into the dispersion to a sufficient degree that a proper vortex formed. At this speed, the mixtures were foamed to a volume of about 425 ml. The shear time required for that purpose is likewise noted in the Tables 3 and 4. Thereafter, the shear rate was reduced to 1000 rpm, Tego® Viscoplus 3030 was added with the aid of a syringe and the mixture was sheared for another 15 min. In this step, the dissolver disc was immersed into the mixtures to such an extent that no further air was introduced into the system, but the complete volume was still in motion.

In all cases, fine homogeneous foams were obtained at the end of this foaming operation. It was noticeable that the foams which had been produced with surfactants 1-6 according to the invention had a higher viscosity in spite of a lower thickener concentration (see Table 3 and 4). The foams were coated onto a siliconized polyester film with the aid of a film applicator (AB3220 from TQC) equipped with an applicator frame (coat thickness=800 μm) and then dried at 60° C. for 10 min and at 120° C. for a further 5 min.

Compared to sample 1, the dried inventive samples 2-7 featured a more homogeneous macroscopic appearance and a more velvety feel. The cell structure of the dried samples was assessed by means of scanning electron microscopy. It was possible here to determine a mean cell size of about 120 μm in the case of comparative sample 1, whereas the inventive samples 2 and 3 had a much finer cell size of about 55 μm.

TABLE 3

Overview of the foams produced in Example 4

|  | Sample 1 | Sample 2 | Sample 3 | Sample 4 |
| --- | --- | --- | --- | --- |
| Impranil® DLU | 150 g | 150 g | 150 g | 150 g |
| Stokal® STA | 2.4 g | | | |
| Stokal® SR | 1.8 g | | | |

TABLE 3-continued

Overview of the foams produced in Example 4

|  | Sample 1 | Sample 2 | Sample 3 | Sample 4 |
|---|---|---|---|---|
| Surfactant 1 |  | 4 g |  |  |
| Surfactant 2 |  |  | 4 g |  |
| Surfactant 3 |  |  |  | 4 g |
| Tego ® Viscoplus 3030 | 0.7 g | 0.2 g | 0.2 g | 0.2 g |
| Shear time | 3 min | 4.5 min | 4 min | 3.5 min |
| Foam viscosity | 14 Pa s | 21 Pa s | 18.5 Pa s | 19 Pa s |
| Cell size of final foam | about 120 μm | about 55 μm | about 55 μm | about 55 μm |

TABLE 4

Overview of the foams produced in Example 4

|  | Sample 5 | Sample 6 | Sample 7 |
|---|---|---|---|
| Impranil ® DLU | 150 g | 150 g | 150 g |
| Surfactant 4 | 4 g |  |  |
| Surfactant 5 |  | 4 g |  |
| Surfactant 6 |  |  | 4 g |
| Tego ® Viscoplus 3030 | 0.2 g | 0.2 g | 0.2 g |
| Shear time | 4 min | 4 min | 4.5 min |
| Foam viscosity | 17 Pa s | 20.5 Pa s | 19 Pa s |
| Cell size of final foam | about 55 μm | about 55 μm | about 55 μm |

Example 5

The compositions listed in the Tables 3 and 4 were foamed analogously to the method described in Example 4 and coated onto a siliconized polyester film by means of an applicator frame (coat thickness=800 μm). This time, however, the samples were dried at 90° C. only for 5 min and at 120° C. for 3 min. It was possible here to observe that comparative sample 1, after drying, had distinct defects (drying cracks), whereas the inventive samples 2-7 could be dried without defects in spite of the shortened, more severe drying conditions.

In addition, for all samples, a coating with a coat thickness of 2000 μm was produced. These were dried at 60° C. for 10 min, at 90° C. for 10 min and at 120° C. for 10 min. Here too, it was possible to dry samples 2-7 that comprise the surfactants according to the invention without defects, whereas the comparative sample had distinct drying cracks 1.

The invention claimed is:

1. A porous polyurethane coating, obtained by applying an aqueous polyurethane dispersion comprising a polyglycerol ether derivative, to a carrier, wherein the polyglycerol ether derivative is of the general formula 2:

$$M_a D_b T_c \qquad \text{Formula 2}$$

where
$M=[C_3H_5(OR")_2O_{1/2}]$
$D=[C_3H_5(OR")_1O_{2/2}]$
$T=[C_3H_5O_{3/2}]$
a=1 to 10,
b=0 to 10,
c=0 to 3,
where the R" radicals are independently identical or different monovalent aliphatic saturated or unsaturated hydrocarbyl radicals having from 2 to 38 carbon atoms or H, wherein at least one of the R" radicals is a hydrocarbyl radical;
and
wherein the porous polyurethane coating has a mean cell size less than 150 μm.

2. The porous polyurethane coating according to claim 1, wherein
a=from 2 to 3,
b=from 1 to 4,
c=0,
where the R" radicals are independently identical or different monovalent aliphatic saturated or unsaturated hydrocarbyl radicals having from 6 to 20 carbon atoms.

3. The porous polyurethane coating according to claim 1, wherein
a=2,
b=from 1 to 4,
c=0,
where the R" radicals are independently identical or different monovalent aliphatic saturated or unsaturated hydrocarbyl radicals having from 8 to 18 carbon atoms.

4. The porous polyurethane coating according to claim 1, wherein the polyglycerol ether derivative has a mean degree of condensation of 1-20, and the polyglycerol ether derivative has an OH number of 1829 to 824 mg KOH/g.

5. The porous polyurethane coating according to claim 1, wherein the polyglycerol ether derivative has a mean degree of condensation of 2-10, and the polyglycerol derivative has an OH number of from 1352-888 mg KOH/g.

6. The porous polyurethane coating according to claim 1, wherein
a=from 2 to 3,
b=from 1 to 4,
c=from 0 to 3,
where the R" radicals are independently identical or different monovalent aliphatic saturated or unsaturated hydrocarbyl radicals having from 2 to 38 carbon atoms or H, wherein at least one of the R" radicals is a hydrocarbyl radical
and
wherein the polyglycerol ether derivative has a mean degree of condensation of 2-10, and the polyglycerol ether derivative has an OH number of from 1244-920 mg KOH/g.

7. The porous polyurethane coating according to claim 6, wherein the polyglycerol ether derivative of formula 2 have been phosphorylated, comprise at least one (R'''O)$_2$P(O)-radical as the R" radical, where the R''' radicals are independently cations, H or R''''—O—, and wherein R'''' is a monovalent aliphatic saturated or unsaturated hydrocarbyl radical having from 3 to 39 carbon atoms.

8. The porous polyurethane coating according to claim 1, wherein
a=from 2 to 3,
b=from 1 to 4,
c=0,
the R" radicals are independently identical or different monovalent aliphatic saturated or unsaturated hydrocarbyl radicals having from 6 to 20 carbon atoms and the polyglycerol ether derivative has a mean degree of condensation of 1-20, and the polyglycerol ether derivative has an OH number of 1829 to 824 mg KOH/g.

9. The porous polyurethane coating according to claim 1, wherein a solids content of the aqueous polyurethane dispersion is in the range of from 20-70% by weight.

10. The porous polyurethane coating according to claim 1, wherein a use concentration of the polyglycerol ether derivative in the aqueous polyurethane dispersion is in the range of from 0.2-10% by weight, based on the total weight of the dispersion.

11. The porous polyurethane coating according to claim 1, wherein the polyglycerol ether derivative is a foaming aid or foam stabilizer for foaming of the aqueous polyurethane dispersion, and as a drying aid, levelling additive, wetting agent and/or rheology additive.

12. A process for producing a porous polyurethane coating, including polyglycerol ether as additives in aqueous polyurethane dispersion, the process comprising
a) providing a mixture comprising an aqueous polyurethane dispersion, at least one polyglycerol ether derivative of general formula 2

$$M_aD_bT_c \qquad \text{Formula 2}$$

where
$M=[C_3H_5(OR'')_2O_{1/2}]$
$D=[C_3H_5(OR'')_1O_{2/2}]$
$T=[C_3H_5O_{3/2}]$
a=1 to 10,
b=0 to 10,
c=0 to 3,
where the R'' radicals are independently identical or different monovalent aliphatic saturated or unsaturated hydrocarbyl radicals having from 2 to 38 carbon atoms or H, wherein at least one of the R'' radicals is a hydrocarbyl radical
b) foaming the mixture to give a homogeneous, fine-cell foam,
c) optionally adding at least one thickener to establish the desired viscosity of the wet foam,
d) applying a coating of the foamed polyurethane dispersion to a suitable carrier,
e) drying the coating,
wherein said porous polyurethane coating has a mean cell size less than 150 μm.

13. The porous polyurethane coating according to claim 1, obtained by the use of polyglycerol ether derivative, as additives in aqueous polyurethane dispersion in the production of such polymer coatings,
wherein the porous polymer coating has a mean cell size less than 100 μm.

14. The porous polyurethane coating according to claim 1, wherein
a=from 2 to 3,
b=from 1 to 4,
c=0,
the R'' radicals are independently identical or different monovalent aliphatic saturated or unsaturated hydrocarbyl radicals having from 6 to 20 carbon atoms,
and the polyglycerol ether derivative has a mean degree of condensation of 1-20, and the polyglycerol ether derivative has an OH number of 1829 to 824 mg KOH/g.

15. The porous polyurethane coating according to claim 2, wherein
a=from 2 to 3,
b=from 1 to 4,
c=0,
the R'' radicals are independently identical or different monovalent aliphatic saturated or unsaturated hydrocarbyl radicals having from 6 to 20 carbon atoms
and the polyglycerol ether derivative has a mean degree of condensation of 1-20, and the polyglycerol ether derivative has an OH number of 1829 to 824 mg KOH/g.

16. The porous polyurethane coating according to claim 1, wherein said polyglycerol ether derivative is of the general formula 3:

$$M_xD_yT_z \qquad \text{Formula 3}$$

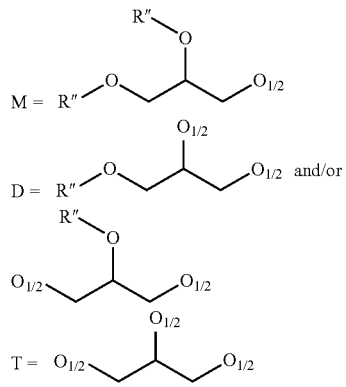

x=from 1 to 10,
y=from 0 to 10,
z=from 0 to 3,
wherein at least one R'' radical is not hydrogen; and
R'' as defined in general formula 2.

17. The porous polyurethane coating according to claim 1, wherein said polyglycerol ether derivative is of the general formula 4:

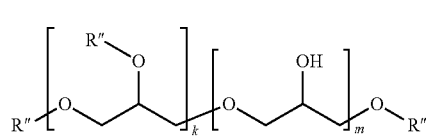

Formula 4 where
k=from 1 to 10,
m=from 0 to 10,
wherein fragments having indices k and m are distributed statistically,
R'' as defined in general formula 2; and
at least one R'' radical is not hydrogen.

18. The porous polyurethane coating according to claim 6, where said polyglycerol ether derivative comprises the general formula 3:

$$M_xD_yT_z \qquad \text{Formula 3}$$

where

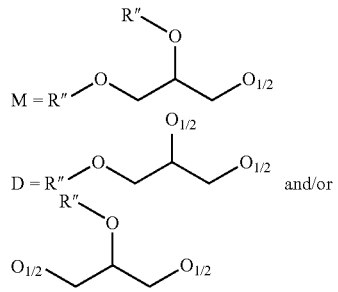

-continued

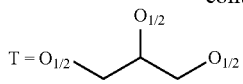

x=from 2 to 3,
y=from 1 to 4,
z=0 to 3,
   wherein R" as defined in general formula 2; and
   at least one R" radical is not hydrogen.

19. The porous polyurethane coating according to claim 6, where said polyglycerol ether derivative comprises the general formula 4:

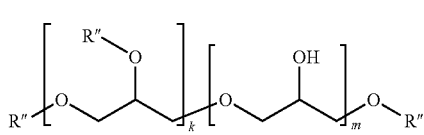

Formula 4 where
k=from 2 to 3,
m=from 1 to 3,
   wherein fragments having indices k and m are distributed statistically;
   R" as defined in general formula 2; and
   at least one R" radical is not hydrogen.

20. The process according to claim 12, wherein said polyglycerol ether derivative is of general formula 3

$M_xD_yT_z$   Formula 3

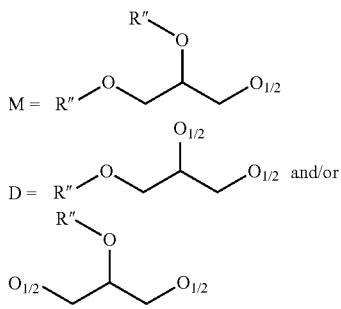

-continued

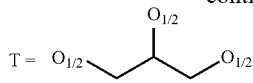

x=from 1 to 10,
y=from 0 to 10,
z=from 0 to 3,
   wherein R" as defined in general formula 2; and
   at least one R" radical is not hydrogen.

21. The process according to claim 12, wherein said polyglycerol ether derivative is of general formula 4

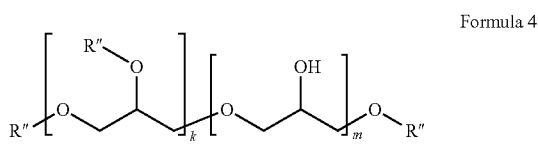

Formula 4 where
k=from 1 to 10,
m=from 0 to 10,
   wherein fragments having indices k and m are distributed statistically;
   R" as defined in general formula 2; and
   at least one R" radical is not hydrogen.

22. The porous polyurethane coating according to claim 16, wherein
x=from 2 to 3,
y=from 1 to 4,
z=0
   and the poly glycerol ether derivative has a mean degree of condensation of 1-20, and the polyglycerol ether derivative has an OH number of 1829 to 824 mg KOH/g.

23. The porous polyurethane coating according to claim 17, wherein
k=from 2 to 3,
m=from 1 to 3
   and the polyglycerol ether derivative has a mean degree of condensation of 1-20, and the polyglycerol ether derivative has an OH number of 1829 to 824 mg KOH/g.

* * * * *